United States Patent
Hashemi et al.

(10) Patent No.: US 11,569,891 B2
(45) Date of Patent: Jan. 31, 2023

(54) METHODS, NETWORK NODES, AND COMPUTER PROGRAMS FOR TRANSMIT TIMING ADJUSTMENT

(71) Applicant: Telefonaktiebolaget LM Ericsson (publ), Stockholm (SE)

(72) Inventors: Mona Hashemi, Ottawa (CA); Henrik Sahlin, Mölnlycke (SE); Per-Erik Eriksson, Stockholm (SE); Behrooz Makki, Gothenburg (SE); Lei Bao, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 24 days.

(21) Appl. No.: 17/255,359

(22) PCT Filed: Jun. 26, 2018

(86) PCT No.: PCT/EP2018/067116
§ 371 (c)(1),
(2) Date: Dec. 22, 2020

(87) PCT Pub. No.: WO2020/001753
PCT Pub. Date: Jan. 2, 2020

(65) Prior Publication Data
US 2021/0266056 A1     Aug. 26, 2021

(51) Int. Cl.
*H04W 76/19* (2018.01)
*H04B 7/06* (2006.01)
(Continued)

(52) U.S. Cl.
CPC ........ *H04B 7/0695* (2013.01); *H04W 56/005* (2013.01); *H04W 68/005* (2013.01); *H04W 76/19* (2018.02)

(58) Field of Classification Search
None
See application file for complete search history.

(56) References Cited

U.S. PATENT DOCUMENTS

| 9,980,242 B2 | 5/2018 | Hu |
| 2010/0046492 A1 | 2/2010 | Abraham et al. |

(Continued)

FOREIGN PATENT DOCUMENTS

| CN | 104219757 A | 12/2014 | |
| EP | 1890403 A2 * | 2/2008 | ............. H04B 7/155 |

(Continued)

OTHER PUBLICATIONS

International Search Report and the Written Opinion of the International Searching Authority, issued in corresponding International Application No. PCT/EP2018/067116, dated Mar. 6, 2019, 12 pages.

(Continued)

*Primary Examiner* — Anh Vu H Ly
(74) *Attorney, Agent, or Firm* — Rothwell, Figg, Ernst & Manbeck, P.C.

(57) ABSTRACT

There is provided mechanisms for transmit time adjustment. A method is performed by a second network node. The method comprises obtaining an indication of a need for transmit time adjustment with a first network node during ongoing communication with the first network node. The method comprises providing a first notification to at least one third network node to adjust its receive timing for receiving a signal from the second network node as part of ongoing communication with the second network node. The method comprises adjusting transmit timing for transmitting a first signal to the first network node as part of the ongoing communication with the first network node and for transmitting at least one second signal to the at last one third network node as part of the ongoing communication with the at least one third network node.

19 Claims, 7 Drawing Sheets

(51) Int. Cl.
 *H04W 56/00* (2009.01)
 *H04W 68/00* (2009.01)

(56) References Cited

U.S. PATENT DOCUMENTS

| | | | |
|---|---|---|---|
| 2016/0057722 A1 | 2/2016 | Premy et al. | |
| 2016/0226563 A1 | 8/2016 | Kohli | |
| 2017/0095215 A1 | 4/2017 | Watson et al. | |
| 2017/0150461 A1 | 5/2017 | Li et al. | |
| 2019/0110268 A1* | 4/2019 | Abedini | H04W 56/0015 |
| 2019/0215048 A1* | 7/2019 | Cirik | H04B 7/088 |

FOREIGN PATENT DOCUMENTS

| | | | | |
|---|---|---|---|---|
| EP | 2487970 A1 * | 8/2012 | | H04L 27/2657 |
| WO | 2015000109 A1 | 1/2015 | | |

OTHER PUBLICATIONS

Qualcomm Incorporated, "Beam refinement after beam recovery or scheduling request" 3GPP TSG-RAN WG2 Meeting #101bis, R2-1805213 (Resubmission of R2-1803031), Sanya, China, Apr. 16-20, 2018, 4 pages.

\* cited by examiner

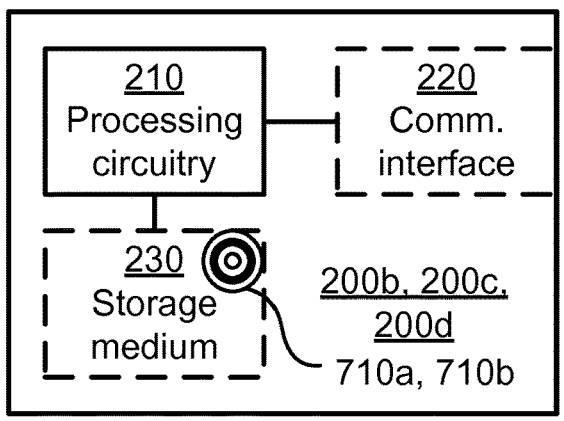
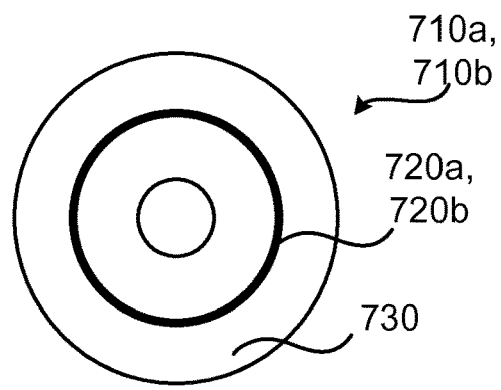
Fig. 7
Fig. 9
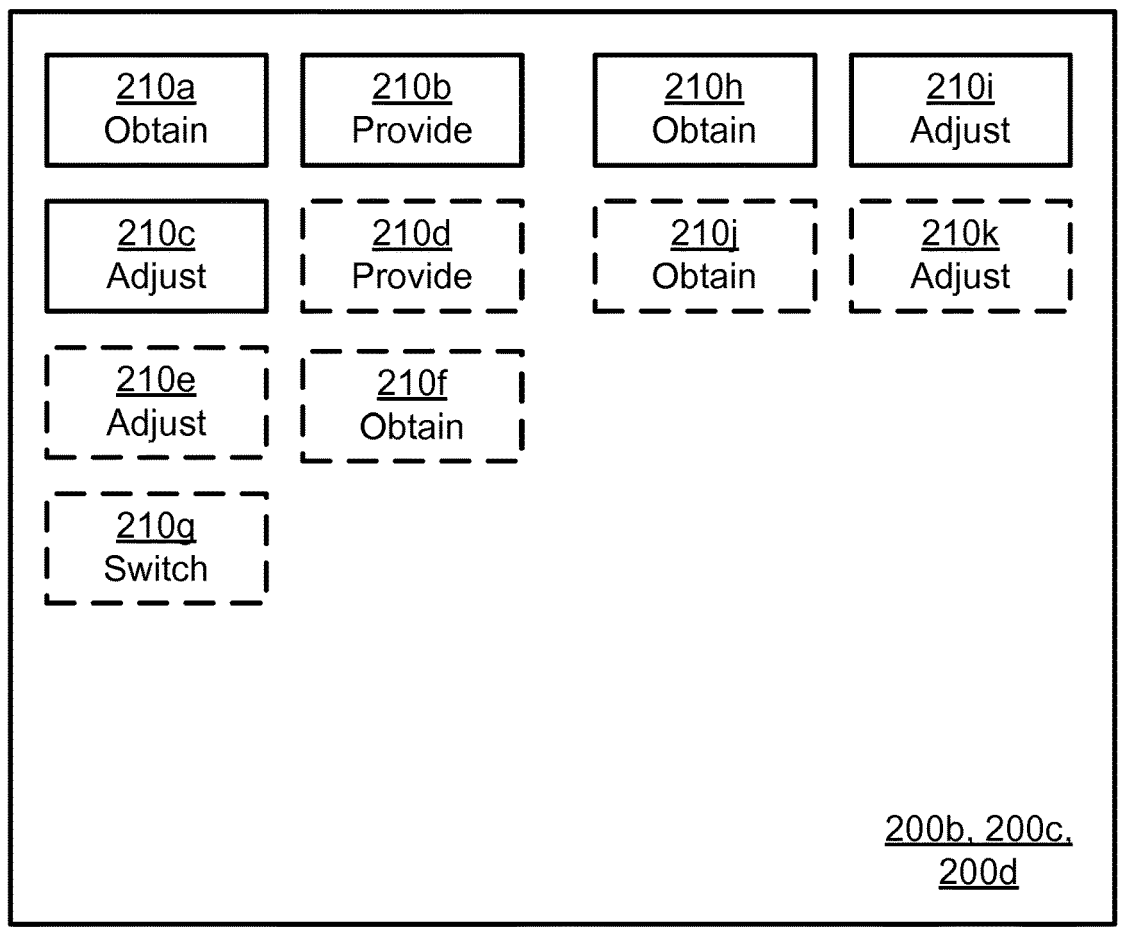
Fig. 8

US 11,569,891 B2

METHODS, NETWORK NODES, AND COMPUTER PROGRAMS FOR TRANSMIT TIMING ADJUSTMENT

CROSS REFERENCE TO RELATED APPLICATION(S)

This application is a 35 U.S.C. § 371 National Phase Entry Application from PCT/EP2018/067116, filed Jun. 26, 2018, designating the United States, the disclosure of which is incorporated herein by reference in its entirety.

TECHNICAL FIELD

Embodiments presented herein relate to a method, a second network node, a computer program, and a computer program product for transmit time adjustment. Embodiments presented herein further relate to a method, a third network node, a computer program, and a computer program product for receiving notification of transmit time adjustment of the second network node.

BACKGROUND

In communications networks, there may be a challenge to obtain good performance and capacity for a given communications protocol, its parameters and the physical environment in which the communications network is deployed.

One examples of a communications network is a point-to-multipoint system or multipoint-to-point system where a so-called donor network node with a wired connection to a core network is wirelessly connected to one or more relay network nodes. FIG. 1 schematically illustrates such a communications network 100a comprising two network nodes 200a, 200b, where only the network node 200a has a wired connection to the core network 120. In turn, the core network 120 could be connected to a service network, such as the Internet. Each network node 200a, 200b is operatively connected to a respective radio access network node 400a, 400b, which could be any of a radio base station, base transceiver station, node B (NB), evolved node B (eNB), gNB, access point, access node, or transmission and reception point (TRP). Collectively, the radio access network nodes 400a, 400b define a radio access network.

In the case of millimeter wave (mmW) signals the strongest transmission path between the donor network node 200a and the relay network node 200b is the line-of-sight (LOS) path 130, in FIG. 1 denoted reference path-LOS. If the reference path would get blocked the communication between the network nodes 200a, 200b would be interrupted and there would be an access outage for end-users, represented by terminal devices 300a, 300b, served by the relay network node 200b in respective beams 150a, 150b. Examples of terminal devices 300a, 300b are portable wireless devices, mobile stations, mobile phones, handsets, wireless local loop phones, user equipment (UE), smartphones, laptop computers, tablet computers, wireless modems, wireless sensor devices, Internet of Things devices, and network equipped vehicles.

Such an event could be on a short-term time scale and to perform a beam management procedure to find an alternative beam 140a, 140b, in which transmission and/or reception beams are reflected at objects 500a, 500b, to reconfigure the link or even to reroute the communication with the terminal devices 300a, 300b to another relay network node, if possible, will be a comparatively complex task and take time. Since beams are transmitted and received along the paths, the terms beam and path can be used interchangeably.

To mitigate this issue there could be mechanisms that allows for a quick switch to an alternative path and, particularly, a procedure for how both sides of the link get this information. For example, each network node could transmit a reference signal in beams in different directions, where each beam has its own individual signature, or identifier. The network node receiving the reference signals will detect and record the received signal level and calculate Channel Quality Indicators (CQI) such as Signal-to-Noise ratio (SNR), Mean Squared Error (MSE), etc. as well as a delay estimation, resulting from the reference signal received in the individual beams and store the signatures of the beams at least with second highest SNR and optionally also the beam with third largest SNR, etc. These beams will then define secondary beams that might be used as backup beams in case of beam link failure of a currently used beam, whereas the beam with highest SNR (i.e., the LOS beam having been blocked) defines the primary beam.

The secondary beams would thus constitute alternative paths between the two network nodes 200a, 200b, and the CQIs (such as SNR, received power, delay, etc.) would give an indication of what performance to expect if any of the alternative beam settings are used. The network node receiving the reference signals in the alternative paths then makes the decision for which alternative path to use in case the primary beam is blocked and communicates this information (including the CQI information for different beams) to the network node having transmitted the reference signal. When there is a beam link failure causing loss of the LOS path 130, the network nodes 200a, 200b should as soon as possible switch over to the negotiated configuration for the alternative path, resulting in communication in a secondary beam along at least one of the alternative beams 140a, 140b, possible with the use of a different modulation and coding scheme (MCS) than for the primary beam.

Communications network based on transmission and reception of OFDM symbols require good synchronization between the transmitter and the receiver (where the transmitter and the receiver are represented by different network nodes in the communication network). The timing becomes more challenging in multipoint-to-point systems, compared to point-to-point systems. This is because communication in multipoint-to-point systems involves signals from several transmitters to be received simultaneously at one receiver. In order to maintain orthogonality, the signals from different transmitters must be received within the cyclic prefix (CP). If orthogonality is lost this will lead to severe inter-carrier interference (ICI), resulting in receive errors at the receiver.

Hence, there is still a need for improved mechanisms for beam switching.

SUMMARY

An object of embodiments herein is to provide mechanisms allowing for efficient beam switching not suffering from the above issues, or at least where the above issues are mitigated or reduced.

According to a first aspect there is presented a method for transmit time adjustment. The method is performed by a second network node. The method comprises obtaining an indication of a need for transmit time adjustment with a first network node during ongoing communication with the first network node. The method comprises providing a first notification to at least one third network node to adjust its receive timing for receiving a signal from the second network node as part of ongoing communication with the second network node. The method comprises adjusting transmit timing for transmitting a first signal to the first network node as part of the ongoing communication with the first network node and for transmitting at least one second signal to the at last one third network node as part of the ongoing communication with the at least one third network node.

According to a second aspect there is presented a second network node for transmit time adjustment. The second network node comprises processing circuitry. The processing circuitry is configured to cause the second network node to obtain an indication of a need for transmit time adjustment with a first network node during ongoing communication with the first network node. The processing circuitry is configured to cause the second network node to provide a first notification to at least one third network node to adjust its receive timing for receiving a signal from the second network node as part of ongoing communication with the second network node. The processing circuitry is configured to cause the second network node to adjust transmit timing for transmitting a first signal to the first network node as part of the ongoing communication with the first network node and for transmitting at least one second signal to the at last one third network node as part of the ongoing communication with the at least one third network node.

According to a third aspect there is presented a second network node for transmit time adjustment. The second network node comprises an obtain module configured to obtain an indication of a need for transmit time adjustment with a first network node during ongoing communication with the first network node. The second network node comprises a provide module configured to provide a first notification to at least one third network node to adjust its receive timing for receiving a signal from the second network node as part of ongoing communication with the second network node. The second network node comprises an adjust module configured to adjust transmit timing for transmitting a first signal to the first network node as part of the ongoing communication with the first network node and for transmitting at least one second signal to the at last one third network node as part of the ongoing communication with the at least one third network node.

According to a fourth aspect there is presented a computer program for transmit time adjustment. The computer program comprises computer program code which, when run on processing circuitry of a second network node. causes the second network node to perform a method according to the first aspect.

According to a fifth aspect there is presented a method for receiving notification of transmit time adjustment of a second network node. The method is performed by a third network node. The method comprises obtaining a first notification from the second network node to adjust its receive timing for receiving a second signal from the second network node as part of ongoing communication with the second network node. The first notification is obtained without the third network node first causing the second network node to provide the notification to the third network node. The method comprises adjusting receive timing for receiving the second signal from the second network node accordingly.

According to a sixth aspect there is presented a third network node for receiving notification of transmit time adjustment of a second network node. The third network node comprises processing circuitry. The processing circuitry is configured to cause the third network node to obtain a first notification from the second network node to adjust its receive timing for receiving a second signal from the second network node as part of ongoing communication with the second network node. The first notification is obtained without the third network node first causing the second network node to provide the notification to the third network node. The processing circuitry is configured to cause the third network node to adjust receive timing for receiving the second signal from the second network node accordingly.

According to a seventh aspect there is presented a third network node for receiving notification of transmit time adjustment of a second network node. The third network node comprises an obtain module configured to obtain a first notification from the second network node to adjust its receive timing for receiving a second signal from the second network node as part of ongoing communication with the second network node. The first notification is obtained without the third network node first causing the second network node to provide the notification to the third network node. The third network node comprises an adjust module configured to adjust receive timing for receiving the second signal from the second network node accordingly.

According to an eight aspect there is presented a computer program for receiving notification of transmit time adjustment of a second network node, the computer program comprising computer program code which, when run on processing circuitry of a third network node, causes the third network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

According to a tenth aspect there is presented a radio access network node comprising a second network node according to the second or third aspects and/or a third network node according to the sixth or seventh aspects.

Advantageously these methods, these network nodes, this radio access network node, and these computer programs enable efficient beam switching that does not suffer from the above issues.

Advantageously these methods, these network nodes, and these computer programs enable the handshaking delays between the network nodes to be minimized when switching to the backup beam, leading to low end-to-end packet transmission delay.

Advantageously these methods, these network nodes, and these computer programs enable the transmit timing to be correctively adjusted, leading to improved throughput. In many cases a correct timing is a prerequisite for maintaining the ongoing communications, i.e., to get a throughput larger than zero.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 7 is a schematic diagram showing functional units of a network node according to an embodiment;

FIG. 8 is a schematic diagram showing functional modules of a network node according to an embodiment; and FIG. 9 shows one example of a computer program product comprising computer readable means according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
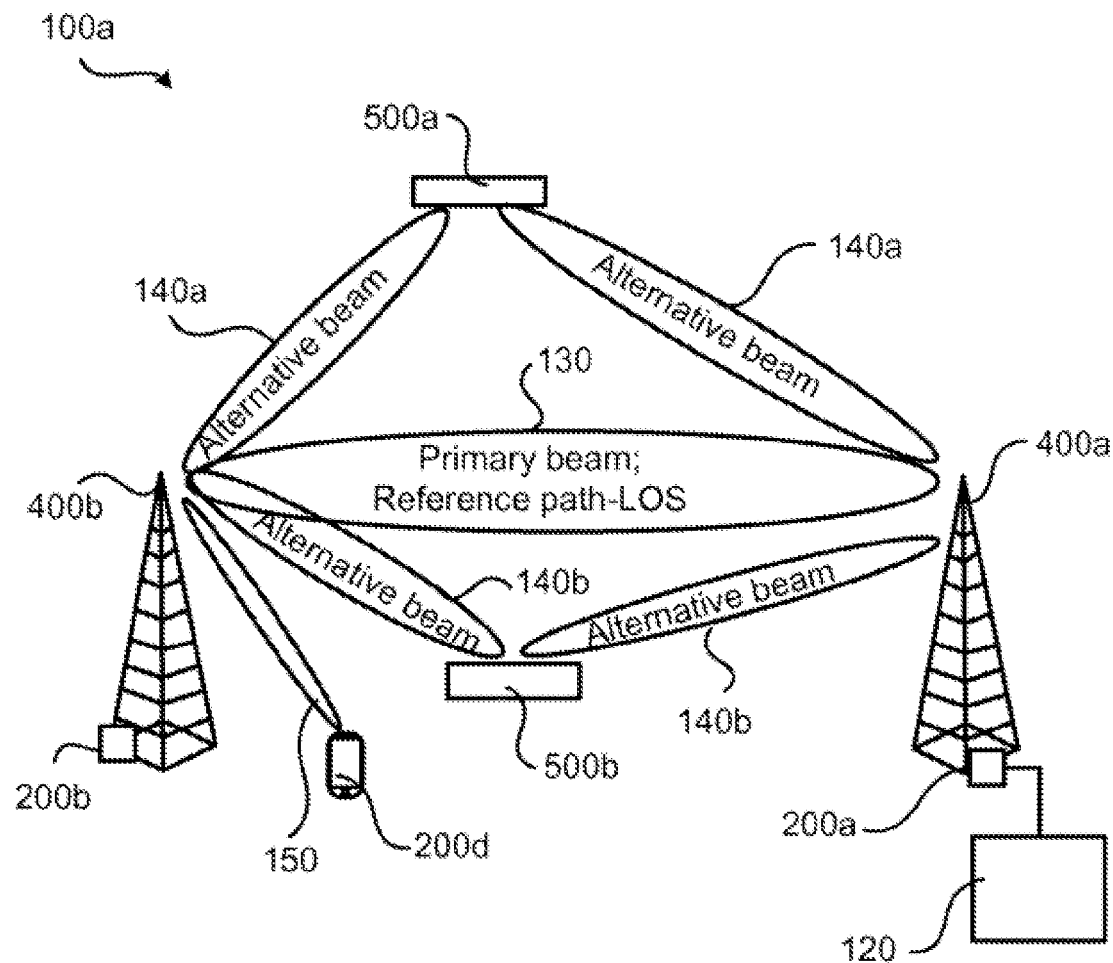
FIGS. 1 and 2 are schematic diagram illustrating communications networks.
Figure 2:
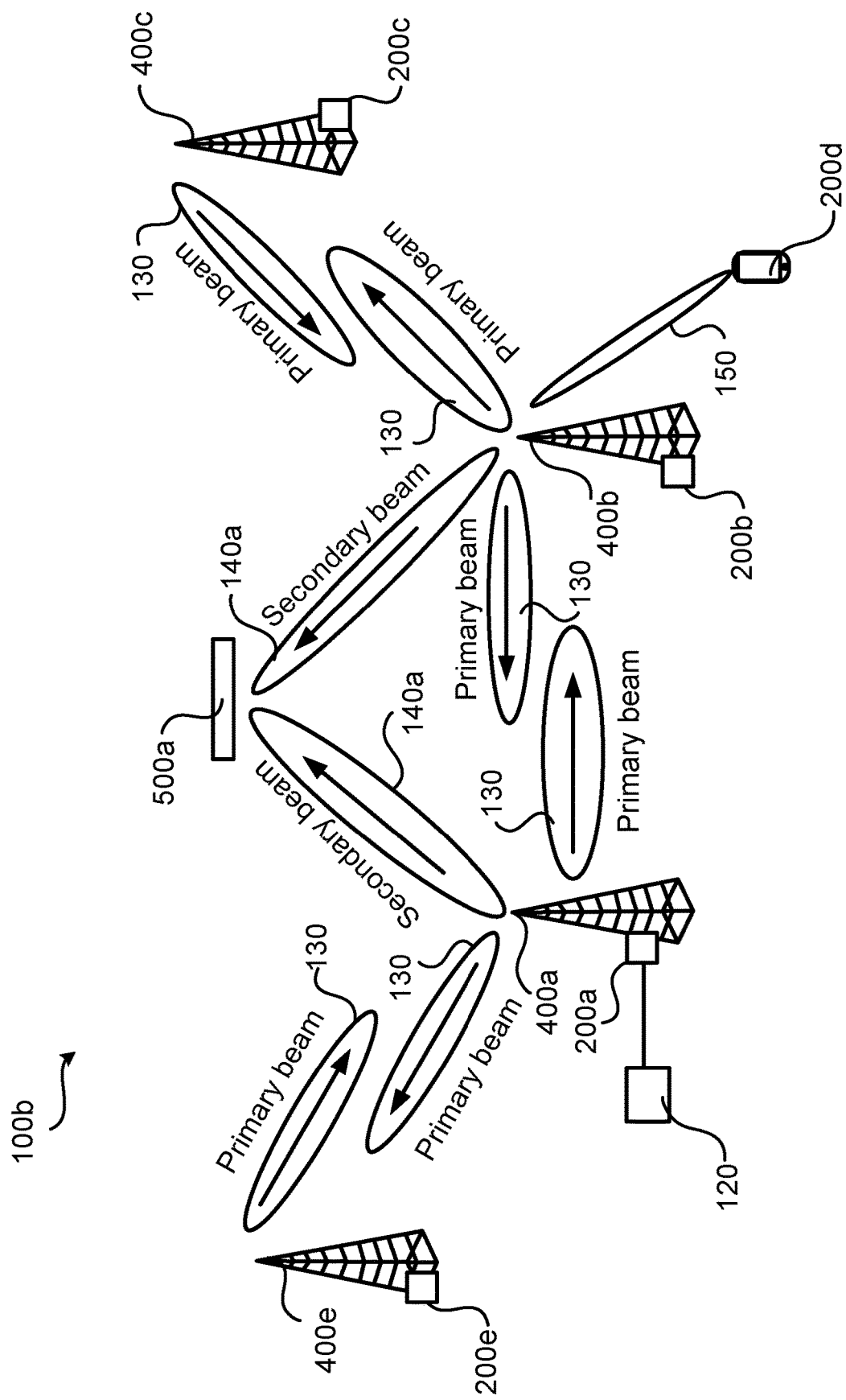

FIG. 2 schematically illustrates a communications network 100b. The communications network 100b is similar to that of FIG. 1 but additionally comprises at least one third network node 200c, 200d and a fourth network node 200e. The network nodes 200a, 200b, 200c, 200e communicate with each other, via the radio access network nodes 400a, 400b, 400c, 400e in beams 130, 140a. Both a primary beam 130 and a secondary beam 140a might be identified between each pair of network nodes.

In the illustrative example of FIG. 2, the first network node 200a communicates with the second network node 200b and the fourth network node 200e. Further, in the illustrative example of FIG. 2, the second network node 200b communicates with the first network node 200a and the at least one third network node 200c, 200d. Further, in the illustrative example of FIG. 2, the third network node 200d is illustrated as a terminal device which communicates with the second network node 200b in a beam 150.

As an illustrative scenario, when the second network node 200b detects a beam link failure on a current beam (for example the primary LOS beam 130) used for ongoing communication with the first network node 200a, then the second network node 200b might switch to a backup beam (for example the secondary beam 140a) according to an agreement with the first network node 200a, and also adjust its transmit timing. At the same time, the first network node 200a will also detect the beam link failure and change to its backup beam (for example the secondary beam 140a). Hence, there might be situations when the second network node 200b needs to adjust its transmit timing.

The embodiments disclosed herein therefore relate to mechanisms for transmit time adjustment and receiving notification of transmit time adjustment of a second network node 200b. In order to obtain such mechanisms there is provided a second network node 200b, a method performed by the second network node 200b, a computer program product comprising code, for example in the form of a computer program, that when run on processing circuitry of the second network node 200b, causes the second network node 200b to perform the method.

The embodiments disclosed herein further relate to mechanisms for receiving notification of transmit time adjustment of a second network node 200b. In order to obtain such mechanisms there is further provided a third network node 200c, 200d, a method performed by the third network node 200c, 200d, and a computer program product comprising code, for example in the form of a computer program, that when run on processing circuitry of the third network node 200c, 200d, causes the third network node 200c, 200d to perform the method.

Figure 3:
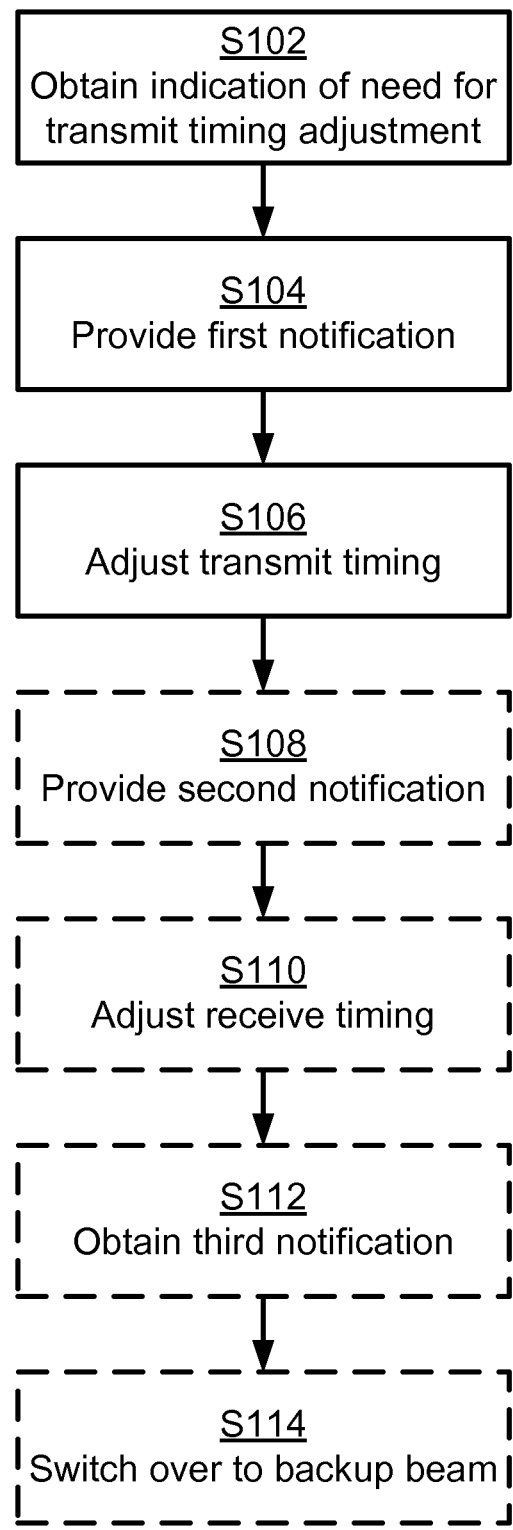
FIGS. 3 and 4 are flowcharts of methods according to embodiments.

Reference is now made to FIG. 3 illustrating a method for transmit time adjustment as performed by the second network node 200b according to an embodiment.

It is assumed that the second network node 200b communicates with a first network node 200a and that a situation occurs where the second network node 200b needs to adjust its transmit timing. Hence, the second network node 200b is configured to perform step S102:

S102: The second network node 200b obtains an indication of a need for transmit time adjustment with a first network node 200a during ongoing communication with the first network node 200a.

The second network node 200b which thus is about to change its transmit timing inform all network nodes operatively connected to it (as defined by the at least one third network node 200c, 200d), except the first network node 200a. Hence, the second network node 200b is configured to perform step S104:

S104: The second network node 200b provides a first notification to at least one third network node 200c, 200d to adjust its receive timing for receiving a signal from the second network node 200b as part of ongoing communication with the second network node 200b.

The first notification is provided before the second network node 200b changes its transmit timing such that all the at least one third network node 200c, 200d can change their receiver timings. That is, the second network node 200b is configured to perform step S106 once the first notification has been provide in step S104:

S106: The second network node 200b adjusts transmit timing for transmitting a first signal to the first network node 200a as part of the ongoing communication with the first network node 200a and for transmitting at least one second signal to the at last one third network node 200c, 200d as part of the ongoing communication with the at least one third network node 200c, 200d.

Embodiments relating to further details of transmit time adjustment as performed by the second network node 200b will now be disclosed.

As will be further disclosed below, the second network node 200b in some aspects also changes its receive timing. Therefore, the at least one third network node 200c, 200d might also be notified to changes its transmit timing. Particularly, according to an embodiment the second network node 200b is configured to perform (optional) step S108:

S108: The second network node 200b provides a second notification to the at least one third network node 200c, 200d to adjust its transmit timing for transmission of a further signal to the second network node 200b as part of the ongoing communication with the second network node 200b before making any transmission of said further signal to the second network node 200b.

There could be different ways to determine how much the receive timing for the at least one third network node 200c, 200d is to be adjusted.

In some aspects, the second network node 200b notifies the at least one third network node 200c, 200d of a timing value with which the at least one third network node 200c, 200d should change their receive timing. In other aspects, the second network node 200b notifies the at least one third network node 200c, 200d of one single timing value, which single timing value is to be used to change the transmit timing and the receive timing. In yet other aspects, the second network node 200b provides separate notifications of the transmit timing and the receive timing to the at least one third network node 200c, 200d. Particularly, according to an embodiment the first notification specifies that the receive timing for the at least one third network node 200c, 200d is to be adjusted to same amount and in same direction as the transmit timing for the at least one third network node 200c, 200d is adjusted.

In some aspects the first network node 200a does not change its transmit timing, thereby causing also the second network node 200b to also adjust its receive timing for signals received from the first network node 200a. Particularly, according to an embodiment the second network node 200b is configured to perform (optional) step S110:

S110: The second network node 200b adjusts receive timing for receiving another signal as part of the ongoing communication with the first network node 200a before making any reception of the so-called another signal from the first network node 200a.

Hence, in some aspects the first network node 200a neither changes its transmit timing nor its receive timing. Thereby, all other network nodes, such as the fourth network node 200e, except the second network node 200a, operatively connected to the first network node 200a neither need to change their transmit timing nor their receive timing.

There could be different ways for the receive timing of the second network node 200b to be adjusted. In some aspects the receive timing is adjusted based on measurements made by the second network node 200b. The measurements are typically made on signals, such as synchronization signals, received by the second network node 200b in the primary beam and the secondary beams. Further, according to an embodiment the receive timing of the second network node 200b is adjusted to same amount but with opposite direction as the transmit timing of the second network node 200b is adjusted.

With respect to the change in transmit timing of the at least one third network node 200c, 200d in step S108, in some aspects the at least one third network node 200c, 200d is notified to change its transmit timing with the same value as the change of receive timing of the second network node 200b.

In some aspects, both the first network node 200a and the second network node 200b change their transmit timings. Hence, according to an embodiment the second network node 200b is configured to perform (optional) step S112:

S112: The second network node 200b obtains a third notification from the first network node 200a that the first network node 200a has adjusted its transmit timing for transmitting another signal to the second network node 200b as part of the ongoing communication with the first network node 200a.

This means that the second network node 200b does not need to change its receive timing (i.e., step S110 needs not to be performed). Thus, none of the at least one third network node 200c, 200d then need to be notified to change their transmit timing.

There could be different ways for the second network node 200b to determine how much to adjust its transmit timing.

According to an embodiment the transmit timing is adjusted based on earlier communicated timing information with the first network node 200a.

In some aspects the transmit timing is adjusted by means of timing advance (TA) settings. That is, according to an embodiment the timing information is based on timing advance settings received from the first network node 200a.

In some aspects, for a time-division duplex (TDD) system the timing advance setting implies that the so-called guard period is changed. The guard period can be defined as a period in time during which no transmission and no reception occurs. Further in this respect, the first network node 200a might transmit timing advance settings comprising a timing advance command in each alternative beam (such as in the primary beams and the secondary beams). Each timing advance command is thus associated with one alternative beam. In some aspects the transmit timing is adjusted based on synchronization signals. That is, according to an embodiment the timing information is based on synchronization signals having been communicated between the first network node 200a and the second network node 200b. There could be different ways for the synchronization signals to be communicated between the first network node 200a and the second network node 200b. In further detail, the first network node 200a might transmit, to the second network node 200b, a respective first synchronization signal in the current beam and in the backup beam. Hence, one synchronization signal is transmitted in each beam. Typically each such synchronization signal has its own identifier (as defined by the beam in which the reference signal is transmitted). This enables the second network node 200b to coarsely adjusts its transmit timing and receive timing for the current beam and the backup beam. The second network node 200b might respond by transmitting a second synchronization signal to the first network node 200a. The first network node 200a then uses the second synchronization signal as received in the different beams to derive timing advance settings for the second network node 200b. The timing advance settings are then transmitted to the second network node 200b. There could be different examples of the synchronization signals. Each synchronization signal could be a Synchronization Signal Block (SSB) which constitutes of one primary synchronization signal (PSS), one secondary synchronization signal (SSS) and physical broadcast channel (PBCH) signals. Each synchronization signal could be a random access (RA) preamble. Further, each synchronization signal could be a channel state information reference signal (CSI-RS), a demodulation reference signal (DMRS) or sounding reference signal (SRS). According to some non-limiting examples each of the first synchronization signal and the second synchronization signal is a PSS, an SSS, an RA preamble, a DMRS, a CSI-RS, or an SRS.

There could be different types of first, second, and third notifications. According to a first example the notification specifies a specific value, or comprises an indication to such a specific value, according to which the transmit and/or receive timing is to be adjusted. Using preconfigured values enables a fast adjustment of the transmit and/or receive timing at the at least one third network node 200c, 200d. According to a second example the notification comprises, or acts as, a trigger for the at least one third network node 200c, 200d to resynchronize its transmit and/or receive timing. In this respect the notification could comprise, or be associated with, a SSB/RACH/CSI-RS. In this respect, the second network node 200b could request the at least one third network node 200c, 200d to send a random access channel (RACH), and where the second network node 200b responds to the RACH with a random access response (RAR) according to which the at least one third network node 200c, 200d resynchronizes its transmit and/or receive timing.

There could be different causes the indication obtained by the second network node 200b from the first network node 200a in step S102 of the need for transmit time adjustment with the first network node 200a. One cause is that there is a beam link failure between the first network node 200a and the second network node 200b. Particularly, according to an embodiment the indication is an indication of beam link failure of a current beam, and the current beam is used for ongoing communication with the first network node 200a.

The beam link failure might cause a switch over to a backup beam for continuing the ongoing communication. Thus, according to an embodiment the second network node 200b is configured to perform (optional) step S114:

S114: The second network node 200b switches over to a backup beam of the current beam for continuing the ongoing communication with the first network node 200a on the backup beam. The transmit timing is adjusted before any transmission of the signal is made on the backup beam.

Beam link failure might, e.g., be based on one, or both, of the first and second network nodes 200a, 200b not receiving any acknowledgement (ACK), or receiving only a negative acknowledgement (NACK), for transmitted payload within a specific time interval. The beam link failure might further be based on a measure on a signal quality, where beam link failure is identified when a signal quality is below a pre-defined threshold. By signal quality, CQIs such as received power, SNR, signal to interference plus noise ratio (SINR), MSE, Block Error Rate (BLER), Bit Error Rate (BER), etc.

In some aspects the first network node 200a, the second network node 200b, and the at least one third network node 200c, 200d are part of a multi-hop communication network, such as the communications networks 100a in FIG. 1 and 100b in FIG. 2.

Figure 4:
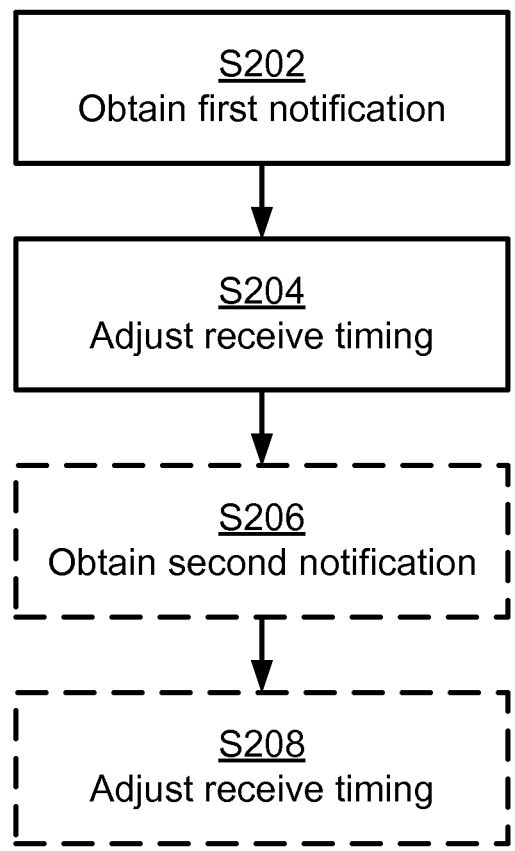

Reference is now made to FIG. 4 illustrating a method for receiving notification of transmit time adjustment of a second network node 200b as performed by the third network node 200c, 200d according to an embodiment.

As disclosed above, the second network node 200b notifies the third network node 200c, 200d to adjust its receive timing. Hence, the third network node 200c, 200d is configured to perform step S202:

S202: The third network node 200c, 200d obtains a first notification from the second network node 200b to adjust its receive timing for receiving a second signal from the second network node 200b as part of ongoing communication with the second network node 200b.

The first notification is obtained without the third network node 200c, 200d first causing the second network node 200b to provide the notification to the third network node 200c, 200d.

Upon having received the first notification the third network node 200c, 200d adjusts its receive timing accordingly. Hence, the third network node 200c, 200d is configured to perform step S204:

S204: The third network node 200c, 200d adjusts receive timing for receiving the second signal from the second network node 200b accordingly.

Embodiments relating to further details of receiving notification of transmit time adjustment of a second network node 200b as performed by the third network node 200c, 200d will now be disclosed.

As disclosed above, in some aspects the second network node 200b notifies the third network node 200c, 200d also to adjust its receive timing. Hence, according to an embodiment the third network node 200c, 200d is configured to perform (optional) step S206:

S206: The third network node 200c, 200d obtains a second notification from the second network node 200b to adjust its transmit timing for transmission of a further signal to the second network node 200b as part of the ongoing communication with the second network node 200b before making any transmission of this so-called further signal to the second network node 200b.

Upon having received the second notification the third network node 200c, 200d adjusts its transmit timing accordingly. Hence, according to an embodiment the third network node 200c, 200d is configured to perform (optional) step S208:

S208: The third network node 200c, 200d adjusts transmit timing for transmitting the further signal to the second network node 200b accordingly.

Different aspects regarding how the transmit timing and the receive timing might be adjusted have been disclosed above. Thus, according to an embodiment the first notification specifies that the receive timing is to be adjusted half as much as the transmit timing is to be adjusted.

As disclosed above, in some aspects the second network node 200b, and the at least one third network node 200c, 200d are part of a multi-hop communication network, such as the communications networks 100a in FIG. 1 and 100b in FIG. 2.

Figure 5:
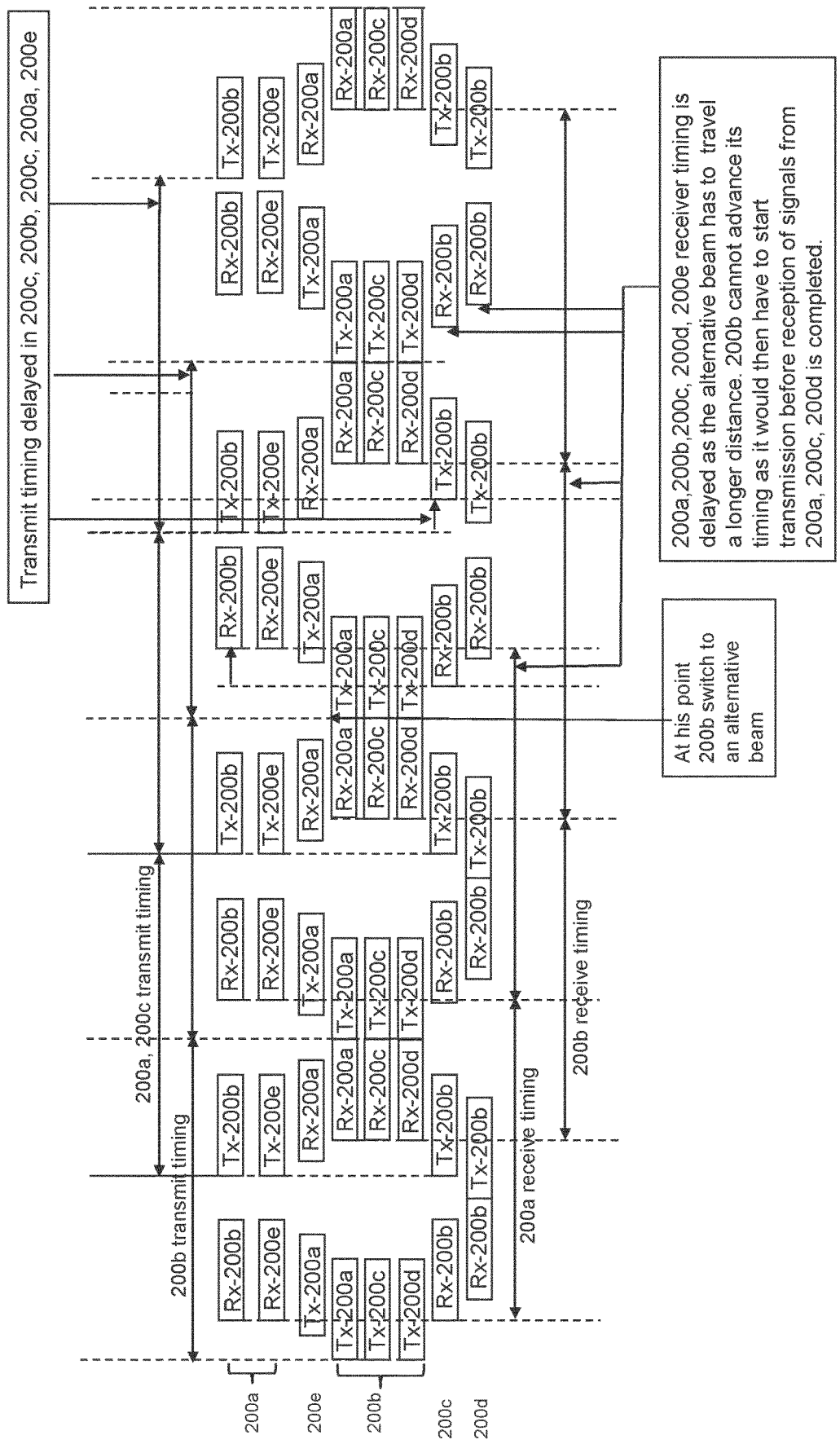
FIGS. 5 and 6 schematically illustrate changes in transmit timing and receive timing according to an embodiments.
Figure 6:
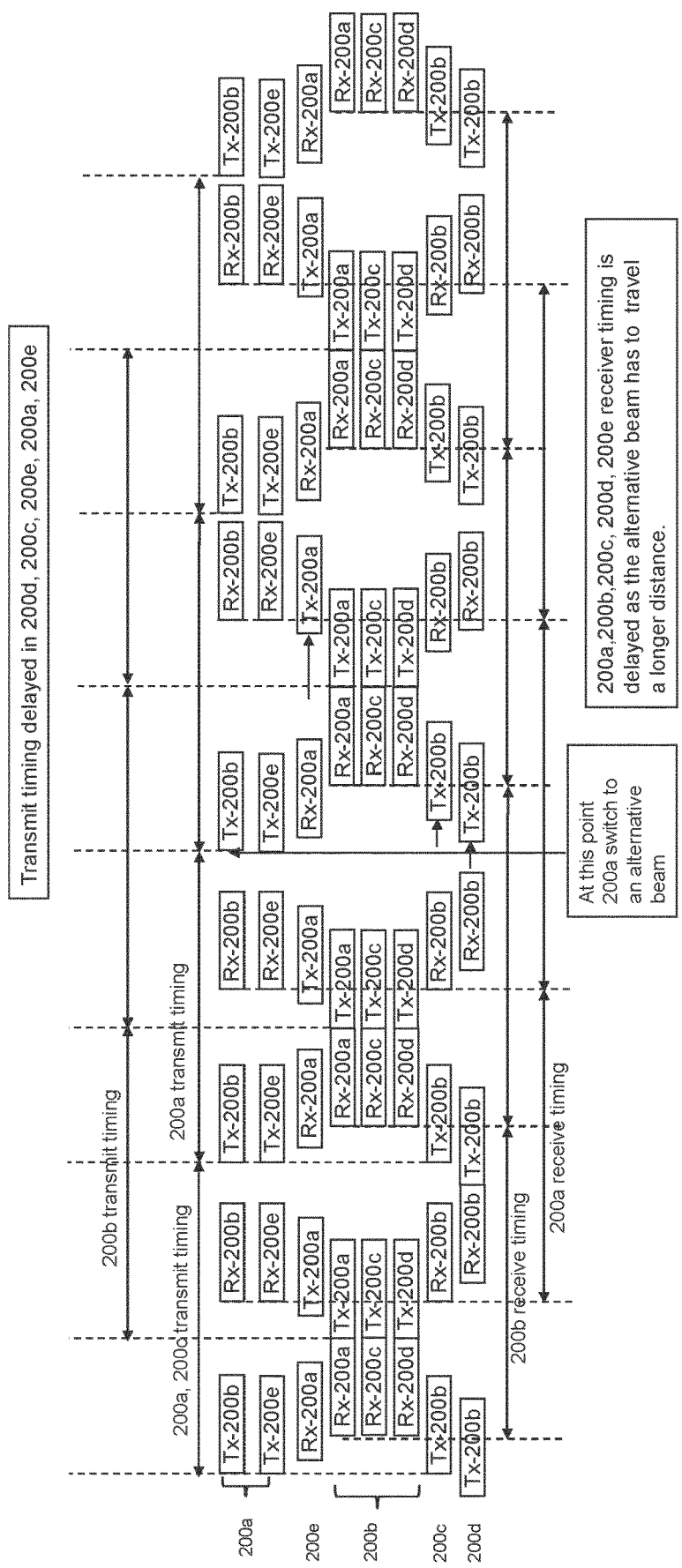

In general terms, the switch to a secondary beam can either start with that network node 200a switches to the secondary beam or that network node 200b switches to the secondary beam. If the change in delay between the primary beam and the secondary beam is larger than the guard period between the received signal and transmitted signal in network node 200a and/or in network node 200b, the network node 200a and/or network node 200b might not be able to advance the signal transmission long enough and the receiver of the network node receiving the secondary beam might thus need to adjust its receive timing. Further aspects relating thereto will now be disclosed with reference to FIGS. 5 and 6. In FIGS. 5 and 6 the notation "Tx-200x" denotes a packet transmitted to network node 200x and the notation "Rx-200x" denotes a packet received from network node 200x.

FIG. 5 schematically illustrates changes in transmit timing and receive timing according to an embodiment for the case where the switch to a secondary beam starts at network node 200b. In this case, as is shown in the figure, the transmitter in network node 200b cannot be advanced and so therefore the receiver in network node 200a makes a timing adjustment implying that also network node 200e changes its transmit timing to ensure that the received signals from 200b and network node 200e are aligned. However, for this case there is initially no change in the transmit timing of network node 200b, which can be seen in the figure, meaning that network node 200c and network node 200d do not yet have to change their receiver timing. But when network node 200a is transmitting, still with the same transmit timing, network node 200b delays its receiver timing which leads to that network node 200c and network node 200d delay their transmit timing to ensure that all received signals at network node 200b are aligned. Now, when network node 200b again transmits it has to delay the transmit timing, which means that at this point also network node 200c and network node 200d have adjusted their receive timing. As a final step, when network node 200a again transmits it delays the transmit timing in order to allow the receptions from network node 200b and network node 200e to be completed. From this stage everything is stable and no more changes are required in the transmit timing or receive timing. As noted, some of the timing adjustments are made after the beam-switch and not before.

FIG. 6 schematically illustrates changes in transmit timing and receive timing according to an embodiment for the case that the switch to a secondary beam starts at network node 200a. This embodiment is similar to that in FIG. 5, but with the difference that the transmit timing is changed in network node 200c and network node 200d before the beam from network node 200a is received. Also at network node 200b the receiver timing is changed. The transmit timing of network node 200b and receive timing of network nodes 200a, 200e, 200c and 200d take place before network node 200b transmits.

FIG. 7 schematically illustrates, in terms of a number of functional units, the components of a network node 200a, 200b, 200c, 200d according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200a, 200b, 200c, 200d to perform a set of operations, or steps, as disclosed above. For example, the storage medium 230 may store the set of operations, and the processing circuitry 210 may be configured to retrieve the set of operations from the storage medium 230 to cause the network node 200a, 200b, 200c, 200d to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200a, 200b, 200c, 200d may further comprise a communications interface 220 for communications with other entities, nodes, functions, and devices of the communications networks 100a, 100b. As such the communications interface 220 may comprise one or more transmitters and receivers, comprising analogue and digital components.

The processing circuitry 210 controls the general operation of the network node 200a, 200b, 200c, 200d e.g. by sending data and control signals to the communications interface 220 and the storage medium 230, by receiving data and reports from the communications interface 220, and by retrieving data and instructions from the storage medium 230. Other components, as well as the related functionality, of the network node 200a, 200b, 200c, 200d are omitted in order not to obscure the concepts presented herein.

FIG. 8 schematically illustrates, in terms of a number of functional modules, the components of a network node 200a, 200b, 200c, 200d according to an embodiment. When acting as a second network node 200b it comprises an obtain module 210a configured to perform step S102, a provide module 210b configured to perform step S104, and an adjust module 210c configured to perform step S106. When acting as a second network node 200b it may further comprise a number of optional functional modules, such as any of a provide module 210d configured to perform step S108, an adjust module 210e configured to perform step S110, an obtain module 210f configured to perform step S112, and a switch module 210g configured to perform step S114.

When acting as a third network node 200c, 200d it comprises an obtain module 210h configured to perform step S202 and an adjust module 210i configured to perform step S204. When acting as a third network node 200c, 200d it may further comprise a number of optional functional modules, such as any of an obtain module 210j configured to perform step S206, and an adjust module 210k configured to perform step S208.

In general terms, each functional module 210a-210k may be implemented in hardware or in software. Preferably, one or more or all functional modules 210a-210k may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210k and to execute these instructions, thereby performing any steps of the network node 200a, 200b, 200c, 200d as disclosed herein.

The network node 200a, 200b, 200c, 200d may be provided as a standalone device or as a part of at least one further device. For example, the network node 200a, 200b, 200c, 200d may be provided in a radio access network node 400a, 400b or in a core network node. Thus, in some aspects there is provided a radio access network node 400a, 400b, 400c, 400d comprising a second network node 200b as herein disclosed and/or a third network node 200c, 200d as herein disclosed. Alternatively, functionality of the network node 200a, 200b, 200c, 200d may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the radio access network than instructions that are not required to be performed in real time.

Thus, a first portion of the instructions performed by the network node 200a, 200b, 200c, 200d may be executed in a first device, and a second portion of the of the instructions performed by the network node 200a, 200b, 200c, 200d may be executed in a second device; the herein disclosed embodiments are not limited to any particular number of devices on which the instructions performed by the network node 200a, 200b, 200c, 200d may be executed. Hence, the methods according to the herein disclosed embodiments are suitable to be performed by a network node 200a, 200b, 200c, 200d residing in a cloud computational environment. Therefore, although a single processing circuitry 210 is illustrated in FIG. 7 the processing circuitry 210 may be distributed among a plurality of devices, or nodes. The same applies to the functional modules 210a-210k of FIG. 8 and the computer programs 720a, 720b of FIG. 9 (see below). One advantages with having network node 200a, 200b, 200c, 200d residing in a cloud computational environment is that it might enable global computation and coordination processing to be performed, in contrast to locally deployed network node 200a, 200b, 200c, 200d where the links might be optimized only based on local requirements. One advantage of having local network nodes 200a, 200b, 200c, 200d is that it might allow for faster beam search and selection.

FIG. 9 shows one example of a computer program product 710a, 710b comprising computer readable means 730. On this computer readable means 730, a computer program 720a can be stored, which computer program 720a can cause the processing circuitry 210 and thereto operatively coupled entities and devices, such as the communications interface 220 and the storage medium 230, to execute methods according to embodiments described herein. The computer program 720a and/or computer program product 710a may thus provide means for performing any steps of the second network node 200b as herein disclosed. On this computer readable means 730, a computer program 720b can be stored, which computer program 720b can cause the processing circuitry 310 and thereto operatively coupled entities and devices, such as the communications interface 320 and the storage medium 330, to execute methods according to embodiments described herein. The computer program 720b and/or computer program product 710b may thus provide means for performing any steps of the third network node 200c, 200d as herein disclosed.

In the example of FIG. 9, the computer program product 710a, 710b is illustrated as an optical disc, such as a CD (compact disc) or a DVD (digital versatile disc) or a Blu-Ray disc. The computer program product 710a, 710b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720a, 720b is here schematically shown as a track on the depicted optical disk, the computer program 720a, 720b can be stored in any way which is suitable for the computer program product 710a, 710b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmit time adjustment, the method being performed by a second network node, the method comprising:
   obtaining an indication of a need for transmit time adjustment with a first network node during ongoing communication with the first network node;
   providing a first notification to at least one third network node to adjust its receive timing for receiving a signal from the second network node as part of ongoing communication with the second network node,
   wherein the first notification specifies that the receive timing is to be adjusted to same amount and in same direction as the transmit timing is adjusted; and
   adjusting transmit timing for transmitting a first signal to the first network node as part of the ongoing communication with the first network node and for transmitting at least one second signal to the at least one third network node as part of the ongoing communication with the at least one third network node.

2. The method according to claim 1, further comprising:
   providing a second notification to the at least one third network node to adjust its transmit timing for transmission of a further signal to the second network node as part of the ongoing communication with the second network node before making any transmission of said further signal to the second network node.

3. The method according to claim 1, further comprising:
   adjusting receive timing for receiving another signal as part of the ongoing communication with the first network node before making any reception of said another signal from the first network node.

4. The method according to claim 3, wherein the receive timing is adjusted to same amount but with opposite direction as the transmit timing is adjusted.

5. The method according to claim 1, further comprising:
   obtaining a third notification from the first network node that the first network node has adjusted its transmit timing for transmitting another signal to the second network node as part of the ongoing communication with the first network node.

6. The method according to claim 1, wherein the transmit timing is adjusted based on earlier communicated timing information with the first network node.

7. The method according to claim 1, wherein the timing information is based on timing advance settings received from the first network node.

8. The method according to claim 1, wherein the indication is an indication of beam link failure of a current beam, and wherein the current beam is used for ongoing communication with the first network node.

9. The method according to claim 8, further comprising:
   switching over to a backup beam of the current beam for continuing the ongoing communication with the first network node on the backup beam, and
   wherein the transmit timing is adjusted before making any transmission of the signal on the backup beam.

10. The method according to claim 1, wherein the first network node, the second network node, and the at least one third network node are part of a multi-hop communication network.

11. A method for receiving notification of transmit time adjustment of a second network node, the method being performed by a third network node, the method comprising:
   obtaining a first notification from the second network node to adjust its receive timing for receiving a second signal from the second network node as part of ongoing communication with the second network node,
   wherein the first notification is obtained without the third network node first causing the second network node to provide the notification to the third network node, and
   wherein the first notification specifies that the receive timing is to be adjusted half as much as the transmit timing is to be adjusted; and
   adjusting receive timing for receiving the second signal from the second network node.

12. The method according to claim 11, further comprising:
obtaining a second notification from the second network node to adjust its transmit timing for transmission of a further signal to the second network node as part of the ongoing communication with the second network node before making any transmission of said further signal to the second network node; and
adjusting transmit timing for transmitting the further signal to the second network node.

13. The method according to claim 11, wherein the second network node and the third network node are part of a multi-hop communication network.

14. A second network node for transmit time adjustment, the second network node comprising processing circuitry, the processing circuitry being configured to cause the second network node to:
obtain an indication of a need for transmit time adjustment with a first network node during ongoing communication with the first network node;
provide a first notification to at least one third network node to adjust its receive timing for receiving a signal from the second network node as part of ongoing communication with the second network node,
wherein the first notification specifies that the receive timing is to be adjusted to same amount and in same direction as the transmit timing is adjusted; and
adjust transmit timing for transmitting a first signal to the first network node) as part of the ongoing communication with the first network node and for transmitting at least one second signal to the at least one third network node as part of the ongoing communication with the at least one third network node.

15. A second network node for transmit time adjustment, the second network node comprising:
an obtain module configured to obtain an indication of a need for transmit time adjustment with a first network node during ongoing communication with the first network node;
a provide module configured to provide a first notification to at least one third network node to adjust its receive timing for receiving a signal from the second network node as part of ongoing communication with the second network node,
wherein the first notification specifies that the receive timing is to be adjusted to same amount and in same direction as the transmit timing is adjusted; and
an adjust module configured to adjust transmit timing for transmitting a first signal to the first network node as part of the ongoing communication with the first network node and for transmitting at least one second signal to the at least one third network node as part of the ongoing communication with the at least one third network node.

16. A third network node for receiving notification of transmit time adjustment of a second network node, the third network node comprising processing circuitry, the processing circuitry being configured to cause the third network node to:
obtain a first notification from the second network node to adjust its receive timing for receiving a second signal from the second network node as part of ongoing communication with the second network node,
wherein the first notification is obtained without the third network node first causing the second network node to provide the notification to the third network node, and
wherein the first notification specifies that the receive timing is to be adjusted half as much as the transmit timing is to be adjusted; and
adjust receive timing for receiving the second signal from the second network node.

17. A third network node for receiving notification of transmit time adjustment of a second network node, the third network node comprising:
an obtain module configured to obtain a first notification from the second network node to adjust its receive timing for receiving a second signal from the second network node as part of ongoing communication with the second network node,
wherein the first notification is obtained without the third network node first causing the second network node to provide the notification to the third network node and
wherein the first notification specifies that the receive timing is to be adjusted half as much as the transmit timing is to be adjusted; and
an adjust module configured to adjust receive timing for receiving the second signal from the second network node.

18. A computer program product for transmit time adjustment comprising a non-transitory computer readable medium storing a computer program comprising computer code which, when run on processing circuitry of a second network node, causes the second network node to:
obtain an indication of a need for transmit time adjustment with a first network node during ongoing communication with the first network node;
provide a first notification to at least one third network node to adjust its receive timing for receiving a signal from the second network node as part of ongoing communication with the second network node,
wherein the first notification specifies that the receive timing is to be adjusted to same amount and in same direction as the transmit timing is adjusted; and
adjust transmit timing for transmitting a first signal to the first network node as part of the ongoing communication with the first network node and for transmitting at least one second signal to the at least one third network node as part of the ongoing communication with the at least one third network node.

19. A computer program product for receiving notification of transmit time adjustment of a second network node comprising a non-transitory computer readable medium storing a computer program comprising computer code which, when run on processing circuitry of a third network node, causes the third network node to:
obtain a first notification from the second network node to adjust its receive timing for receiving a second signal from the second network node as part of ongoing communication with the second network node,
wherein the first notification is obtained without the third network node first causing the second network node to provide the notification to the third network node, and
wherein the first notification specifies that the receive timing is to be adjusted half as much as the transmit timing is to be adjusted; and
adjust receive timing for receiving the second signal from the second network node.

* * * * *